(No Model.) 2 Sheets—Sheet 1.
P. W. & J. B. WOOD.
MECHANISM FOR ELECTRICAL CONNECTIONS.
No. 376,973. Patented Jan. 24, 1888.
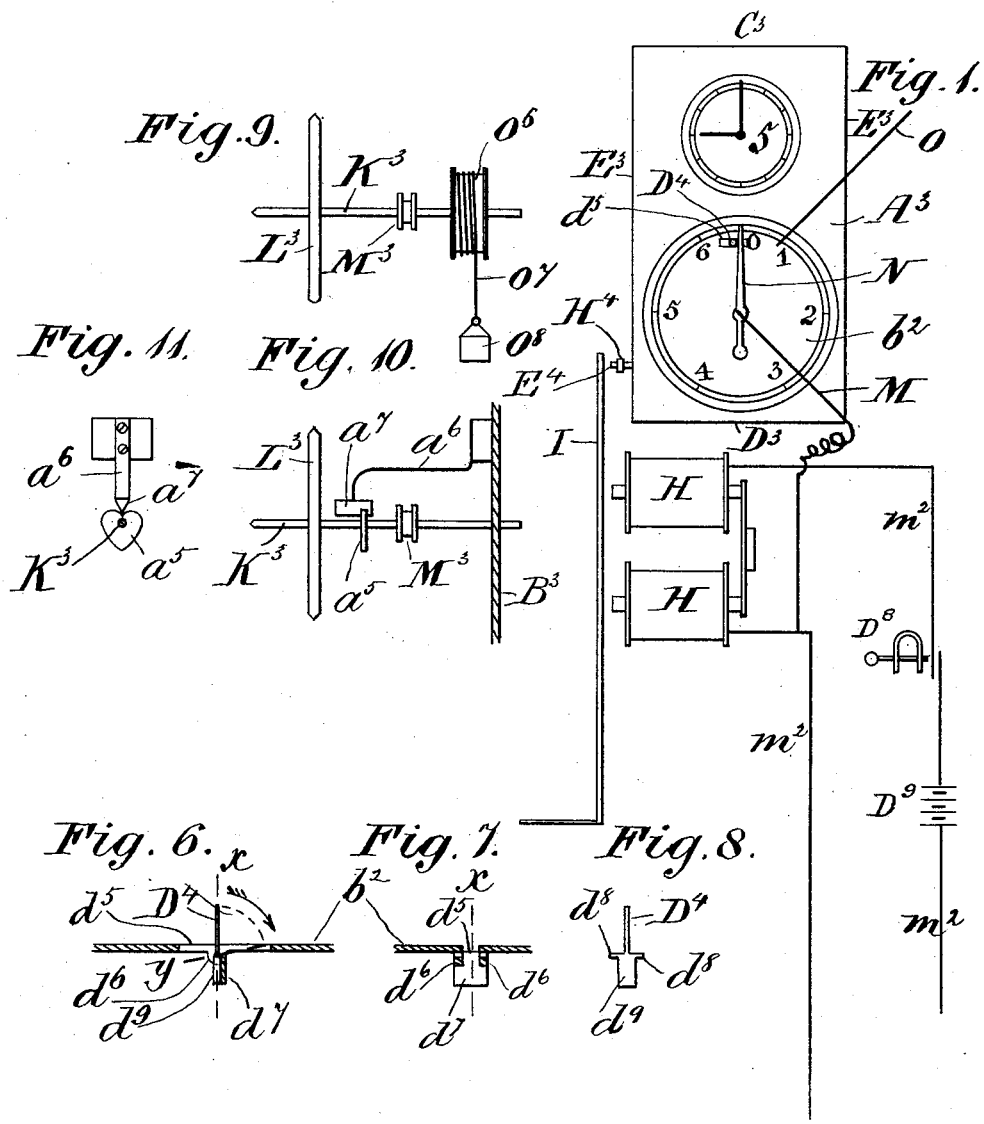
Witnesses.
Inventors.
P. W. Wood
J. B. Wood
By their Attorney
Charles G. C. Simpson (No Model.) 2 Sheets—Sheet 2.
P. W. & J. B. WOOD.
MECHANISM FOR ELECTRICAL CONNECTIONS.
No. 376,973. Patented Jan. 24, 1888.
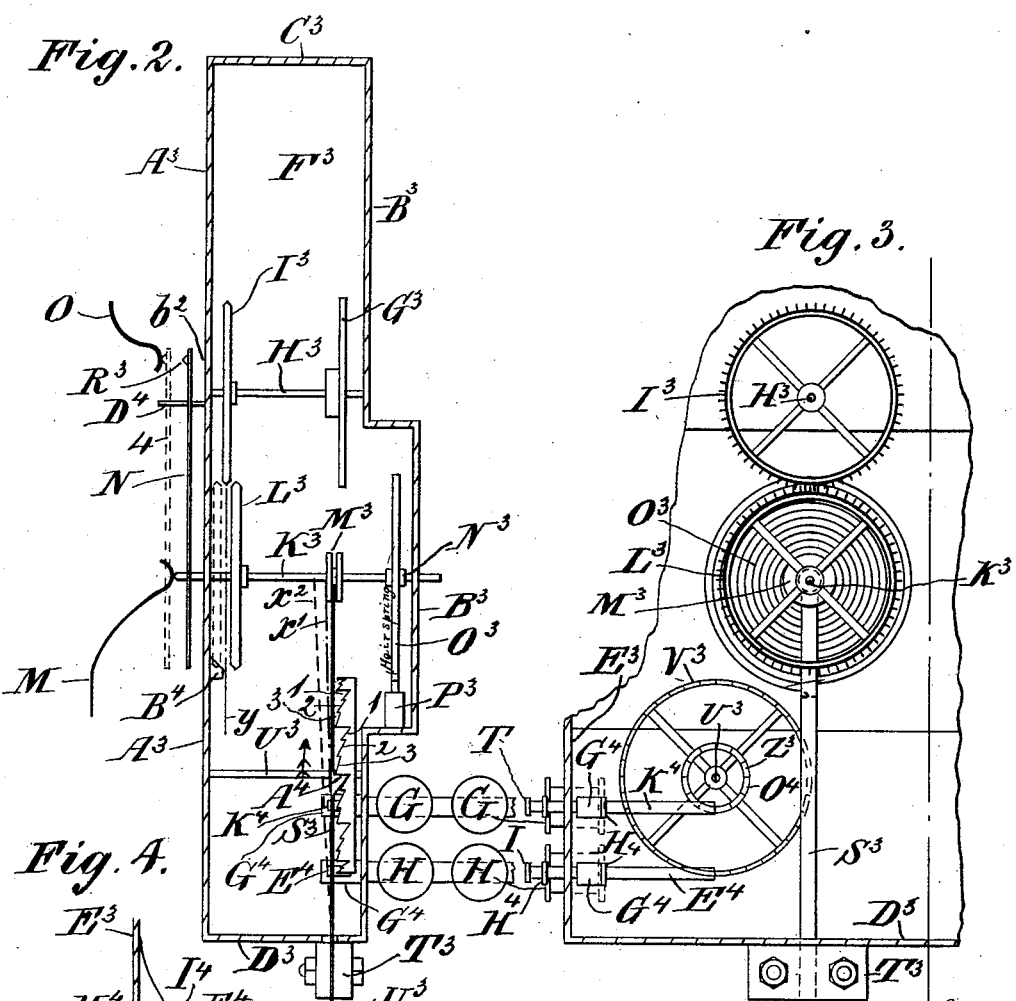
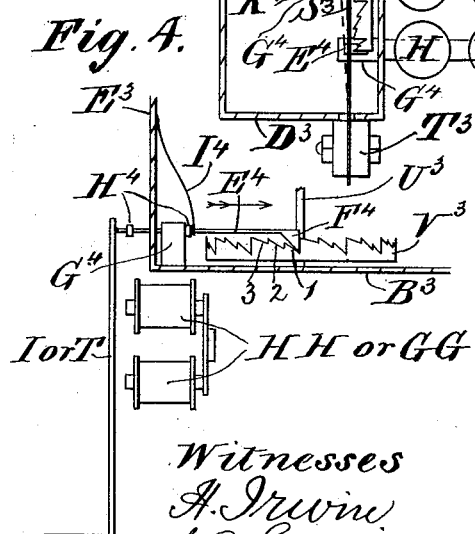
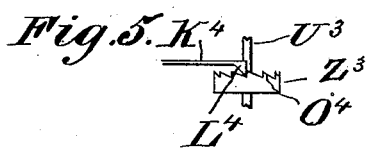
Witnesses
A. Irwin
J. A. Grenier
Inventors.
Peter W. Wood
John B. Wood
By their Attorney
Charles G. C. Simpson

UNITED STATES PATENT OFFICE.

PETER W. WOOD AND JOHN B. WOOD, OF MONTREAL, QUEBEC, CANADA.

MECHANISM FOR ELECTRICAL CONNECTIONS.

SPECIFICATION forming part of Letters Patent No. 376,973, dated January 24, 1888.

Application filed June 21, 1887. Serial No. 242,003. (No model.)

*To all whom it may concern:*

Be it known that we, PETER WENTWORTH WOOD and JOHN BAXTER WOOD, both subjects of the Queen of Great Britain, and both residents of the city of Montreal, in the district of Montreal and Province of Quebec, Canada, have invented certain new and useful Improvements in Mechanisms for Electrical Connections; and we do hereby declare that the following is a full, clear, and exact description of the same.

This invention has reference to the construction of a mechanism placed in each station or location in a circuit and arranged so that the end or "ground" may be made through any of such mechanisms, so as to form a direct wire or line of connection between the station operating and the station desired to be connected with in any of the stations or locations connected in one circuit.

We wish here to particularly call attention to the fact that the present invention is confined exclusively to the said mechanism and has no connection whatever with the running of circuits or connecting of wires further than the connecting of the wire M with the hand N, operating as a rotating connector between the said wire M and the wire O, as will be hereinafter described.

In the drawings hereunto annexed similar letters and numerals of reference indicate like parts.

Figure 1 is a front elevation of the casing in which the mechanism forming our invention is inclosed and showing the connection of a circuit and battery therewith. Fig. 2 is a diagram of the mechanism forming the invention and section of casing, taken at line $x$, Fig. 3. Fig. 3 is a plan of the mechanism (situated behind or below the front of the casing) shown in Fig. 2. Figs. 4 to 8, inclusive, are details of construction. Figs. 9, 10, and 11 show modifications of the means for causing the hand N to fly back to zero.

M is a wire connecting the hand or rotating connector N with the circuit-wire $m^2$, along which the current of electricity of the battery $D^9$, situated, as shown, in connection with the wire $m^2$, will be passed when the button $D^8$, situated, as shown, to close the circuit, is pressed to so close the circuit, by doing which the current of electricity passes through the magnets H H, both ends of the wire $m^2$ being connected with the ground, (the battery $D^9$ and push-button $D^8$ being of ordinary construction.) The far end of the wire O is in connection with the ground, so that when the hand N is brought to position to form a connection with the near end of wire O a direct connection is closed through the hand N between the wires M and O. The casing is of ordinary construction, and of it $A^3$ is the front, $B^3$ the back, $C^3$ the top, $D^3$ the bottom, and $E^3$ the sides.

In the upper part or space, $F^3$, is situated a watch or other mechanism. (Not shown in the drawings, because it only bears the same relation to our mechanism that a steam-engine or other motor does to the machine it is arranged to give motion to.)

If the motor is a watch mechanism, then of such mechanism $G^3$ is the ordinary minute gear-wheel, and $H^3$ the axle, journaled in the casing in an ordinary manner; or if other motors are used, then $G^3$ is a wheel and $H^3$ an axle arranged to revolve continuously at the speed of about one revolution per minute. On the axle $H^3$ is secured a knife-edged toothed gear-wheel, $I^3$.

Particular attention is here called to the fact that a continuously-revolving axle, $H^3$, and wheels $G^3$ and $I^3$ are mentioned as being desirable, because if the motive power is supplied by a watch-movement actuated by an ordinary mainspring such mechanisms will not always start when the mainspring is partly run down.

$K^3$ is an axle provided with a knife-edged toothed gear-wheel, $L^3$. This wheel $L^3$ and axle $K^3$ are situated so that when the wheel L is moved to the position of the line $y$ in Fig. 2 it intermeshes with the wheel $I^3$ on the axle $H^3$, and is revolved thereby. The axle $K^3$ extends through the casing at both back $B^3$ and front $A^3$, as shown, and has secured upon it a flanged collet or collar, $M^3$, and an ordinary hair-spring collet, $N^3$, to which is attached a hair-spring, $O^3$, the outer end of which is held by an ordinary hair-spring stud, $P^3$. On that part of the axle $K^3$ which extends through the front $A^3$ is secured a hand, N, provided with an electric point, $R^3$.

$S^3$ is a spring-bar, one end of which is entered between the flanges of the collar or collet $M^3$, and the other end is gripped in a rest, $T^3$, which holds it rigidly from any longitudinal and transverse motion, while by its flexibility it is able freely to move backward and forward.

$U^3$ is an axle on which is secured a double wheel or two wheels, $V^3$ and $Z^3$. The axle and wheels are situated so that a portion of the wheel $V^3$ will come immediately at the back or under the spring-bar $S^3$. The edge of the wheel $V^3$ is cut in the form of teeth of equal length in a similar manner that a verge watch-wheel is cut; but in the present case these teeth are of unequal height. Preferably they are cut in sets of three teeth, marked 1, 2, and 3. (See Figs. 3 and 4.) The bottoms of all the teeth 1 are of equal height with one another. So also are the bottoms of those marked 2 and 3.

The spring-bar $S^3$ is provided with a pawl, $A^4$, attached securely thereon; or it may, if desired, be made integral therewith, the point of the pawl being arranged to rest in the bottom of the teeth. As shown in Fig. 2, it is resting at the bottom of one of the teeth, 1. Now, if the wheel $V^3$ is turned round in the direction of the arrow in Fig. 2 the amount of one tooth, it will cause the spring-bar $S^3$ to rise to the position of the chain-line $x'$ and move the axle $K^3$ and the wheel $L^3$ to the line $y$, in which position it will intermesh with the wheel $I^3$ and be rotated thereby, the hair-spring $O^3$ yielding to allow of the movement. If the wheel $V^3$ be again moved round the amount of one tooth, it will bring the point of the pawl to rest at the bottom of one of the teeth, 3, which, being at a greater height, will move the spring-bar $S^3$ to the position shown by the dotted line $x^2$. This moves the wheel $L^3$ to the position in front or "beyond" out of contact with the wheel $I^3$, as shown by the position indicated in front of the line $y$ in Fig. 2, and in this position it is no longer rotated by the wheel $I^3$.

$B^4$ is a knife-edged stop situated on the front $A^3$ of the casing, so that just as the wheel $L^3$ is moved forward beyond out of gear with the wheel $I^3$ it is caught and retained in the position it has been rotated to by the wheel $I^3$. This must be well adjusted, so that the wheel $L^3$ cannot be engaged at the same time with both the wheel $I^3$ and stop $B^4$, and yet so close that the wheel $L^3$ will not have an opportunity to revolve in passing from the one to the other by the action of the hair-spring $O^3$, which is set with a tension, so that when the wheel $L^3$ is released it will cause the axle $K^3$ and wheel $L^3$ to revolve and move the hand N, in the manner hereinafter mentioned, back to the stop $D^4$—that is to say, back to zero.

In front of the end of the axle $K^3$ is situated the end of the circuit-wire M, arranged to slightly rest against the front end of the axle $K^3$ when the said axle is raised to the position which will bring the hand N to the position 4 in Fig. 2. The end of the wire M is arranged with a very easy spring, so that the axle $K^3$ will not be retarded at the end of its forward movement by the wire M, which yields the required amount to form a good connection between the hand N and wire M.

The circuit-wire O is placed at the number on the dial shown, which represents the number of the station or location in the circuit at which this particular construction of our invention is placed. For example, we will suppose the construction or mechanism shown in the drawings to be situated at station or location No. 1 in the circuit. Therefore the end of the wire O is situated at 1. Had it been situated at station or location No. 5 the end of the wire O would have been similarly situated at 5 on the dial $b^2$, and so on for any other station or location. The wire O is further situated at such a distance in front of the dial $b^2$ that when the axle $K^3$ is moved forward the full extent, as shown by the dotted line $x^2$, the hand N is thereby raised to the position, 4, at which the wheel $L^3$ is beyond contact with the wheel $I^3$, which will have been caused to rotate the wheel $L^3$ until the point $R^3$ of the hand is behind the wire O before the hand is raised to the position 4, the doing of which brings the point $R^3$ into contact with the wire O and completes the circuit.

$D^4$ is a pin projecting from the front $A^3$ of the casing, the arrangement being such that when the hand N rests against it on the one side the said hand will be at zero.

The object of the stop or pin $D^4$ is not only to stop the hand N when moving in the one direction at zero, but also to prevent the said hand from being revolved more than one revolution in either direction, and thus unwinding or too tightly winding up the hair-spring $O^3$.

From the above it will be seen that when the parts of the invention are in the position shown by solid lines in Fig. 2 the revolving wheel $I^3$, (revolved by watch mechanism, which we, generally speaking, consider as the best or most suitable means or form of motor, but which may also be operated by any other steady moving motor,) revolves continuously without producing any effect whatever upon our invention proper; but as soon as the wheel $L^3$ is moved and geared with the wheel $I^3$ the hand N begins to revolve in the direction of from zero to No. 1 on the dial $b^2$, and will continue to revolve to the last number on the dial, or until it comes to the opposite side of the stop $D^4$, before doing which it will have passed before the last number on the dial, and should before coming to the stop $D^4$ be stopped by moving the wheel $L^3$ to its most forward position beyond contact with the wheel $I^3$ and engaged with the stop $D^4$.

To prevent any damage being done to the mechanism by the hand N being allowed to press against the stop $D^4$ at the opposite side to zero, it may be arranged with a hinge or other similar device to yield and turn down nearly flat upon the dial, and thus allow the hand to pass over it. This will have the effect of further winding up the hair-spring O³ when such is used to cause the hand N to fly back to zero. This should not be indulged in as a practice, the said yielding of the stop being only provided to prevent ignorant or careless persons from readily causing an injury to the mechanism, and if the hair-spring has become overwound it should be at once put right by returning the hand N over the stop in the reverse direction by first turning down the stop, and when so down passing the hand back over it.

One manner out of many that may be arranged for turning down the stop $D^4$ is illustrated in Figs. 6, 7, and 8. This is done by forming an opening, $d^5$, in the dial $b^2$, and by the side of the opening forming eyes $d^6$ and a projection, $d^7$, extending across the opening. The stop $D^4$ is provided with bearings $d^8$, which are received within the eyes $d^6$, and with an extension, $d^9$, may be held against the projection $d^7$ by magnetic attraction. The projection $d^7$ will prevent the stop $D^4$ from turning down in the opposite direction to that indicated by the arrow in Fig. 6, while it is free to turn down to the position of the line $y$ in Fig. 6. The section shown in Fig. 6 is taken at line $x$, Fig. 7, and the section shown in Fig. 7 is taken at line $x$ in Fig. 6.

It remains now to be shown how the wheels V³ and Z³ are to be operated to actuate the spring-bar S³, and thus cause the above-described result; also, to make such general remarks as may be considered desirable.

H H are magnets; I, their armature. G G are magnets, and T their armature. These are placed in relation to the telephonic or telegraphic circuit as shown, and are operated by currents of electricity.

We will first describe the magnets H H in their operation upon the wheel V³.

E⁴ is a spring-bar provided with a pawl, F⁴, arranged to engage with the teeth 1 2 3 of the wheel V³. This is carried in a guide, G⁴, attached and suitably situated on the back B³ of the casing. The bar E⁴ is provided with two collars or other stops, H⁴, so arranged that they will allow the bar E⁴ to move longitudinally the amount required for the pawl F⁴ to revolve the wheel V³ the amount of one of the teeth, 1, 2, or 3, at one operation of the bar. The armature I and magnets H H are situated and adjusted in relation to the outer end of the bar E⁴ so that when the magnets are caused to attract the armature I this presses on the end of the spring-bar E⁴ and moves it until the outer stop, H⁴, stops the motion. In so moving the bar the wheel V³ is revolved the amount of one of the teeth, 1, 2, or 3, as the case may be. As soon as the magnets release the armature a spring, I⁴, returns the bar E⁴ to the position shown in Fig. 4, ready for the next operation of the magnets upon the armature, or if the bar E⁴ is attached to the armature the spring of the armature will cause the return of the bar E⁴. Any motion of the wheel V³ in a reverse direction, which would be caused by the return of the spring-bar E⁴, is prevented by the pawl A⁴ of the bar S³. With regard to the wheel Z³ and the means by which it is operated, K⁴ is a spring-bar provided with a pawl, L⁴, to act on the teeth O⁴ of the wheel Z³. This bar is carried in a guide, G⁴, is provided with stops H⁴ and a spring, I⁴, if desired, exactly similar to those of the bar E⁴, and is operated in the same way by the magnets G G and armature T that the spring-bar E⁴ is by the magnets H H and armature I.

It was hereinbefore mentioned that for each set of teeth on the wheel V³ there is one tooth on the wheel Z³, and for the purpose of giving the three described positions to the wheel L³ there are three teeth in each set of teeth of three different "heights," the teeth on the wheel Z³ being so adjusted that each time the pawl F⁴ comes to the bottom of a tooth 1 on the wheel V³ the pawl L⁴ will come to the bottom of a tooth O⁴ on the wheel Z³. Now, should for any reason the mechanisms in the various stations or locations in a circuit have become deranged, so that the hands N do not all properly stand at zero, it is only necessary to send a current of electricity through the magnets G G (which are of heavier resistance and require a more powerful battery than the magnets H H) in each of the stations or locations, and thus bring simultaneously all the hands N to zero.

We would here remark that we do not look upon the wheel Z³ and the means by which it is operated as an absolute necessity, because if the mechanism is properly constructed, worked, and kept this may be dispensed with without difficulty; but we do look upon them as a very desirable precaution and means by which to "straighten up" all the hands to zero in all the mechanisms in each of the stations or locations in the circuit at any moment desired.

We have given a favorable mention to using a watch mechanism over others as a motor for operating the axle H³, and where such is used, if desired, it is only necessary to provide hands and a dial to it, as shown at 5 in Fig. 1, and a useful time-piece is added to our invention at a very slight expense.

Instead of the hair spring O³, the ordinary "heart-movement" used in Swiss fly-back watches may be employed, and other devices—such as a pulley, cord, and weight—may be arranged instead of the hair-spring O³ for causing the hands N to fly back to zero. These are considered by us as equivalent devices and are illustrated by Figs. 9, 10, and 11.

In Fig. 9 a pulley, O⁶, is secured on the axle K³, round which is placed a cord, O⁷, to the end of which is attached a weight, O⁸, to cause the said fly-back action. In Figs. 10 and 11 the said Swiss fly-back mechanism is illustrated. Here on the axle K³ is secured a heart-shaped cam, $a^5$. $a^6$ is a spring secured in suitable position to press the knife-edge of a head, $a^7$, upon the periphery of the heart-shaped cam $a^5$, and thus cause the fly-back or return of the hand N to zero, in the manner well understood.

What we claim, and wish to secure by Letters Patent, is as follows:

1. In a mechanism for making electrical connections, as described, the combination, with a revolving gear-wheel, of a gear-wheel and axle longitudinally movable from its position out of gear with the said revolving gear-wheel into gear therewith, and to again move beyond the position of gearing with the said revolving wheel, the said axle of the said wheel and axle being further provided with a hand arranged as described, and, in combination with the two wires, of an electric circuit, one of which wires is arranged to connect with the axle of the said wheel and axle, and the other is arranged to connect with the point of the hand when the said hand has been rotated to the required position, as described, and then moved to the position 4, thereby forming an electrical connection of the said two circuit-wires, the whole substantially as described.

2. In a mechanism for making electric connections, as described, the combination of a revolving gear-wheel, $I^3$, with a gear-wheel and axle longitudinally movable from a position out of gear with the said revolving gear-wheel into gear therewith and to again move beyond the position of gearing with the wheel $I^3$, the axle of the said wheel and axle being further provided with a hand, a stop adjacent to the periphery of the gear-wheel, so arranged that when the said gear-wheel has passed beyond or out of gear with the said gear-wheel $I^3$ it will be held by the said stop stationary, the above further in combination with two electric circuit-wires and the said hand forming an electrical connection between the said two circuit-wires, the whole substantially as described.

3. The combination, in a mechanism for making electric connections, of a revolving gear-wheel with a gear-wheel and axle longitudinally movable from a position out of gear with the said revolving gear-wheel into gear, and beyond gearing therewith, the axle of the said wheel and axle being provided with a hand arranged to form a connection between two electric circuit-wires when operated by the said wheel and axle, as described, with the two said circuit-wires, and with a stop, $B^4$, as described, by which the said hand is caused to retain the connection between the said circuit-wires and hand, the said axle of the said wheel and axle being also provided with a fly-back device by which, when the said wheel and axle have been returned to their first position out of gear with the wheel $I^3$, the fly-back device causes the said hand to return to zero, the whole constructed and arranged substantially as described and shown.

4. In a mechanism for making electric connections, as described, the combination of the gear-wheel $I^3$, axle $K^3$, longitudinally movable, having gear-wheel $L^3$, hand N, flanged collar or collet $M^3$, and hair-spring $O^3$, secured upon the said axle $K^3$, stop $B^4$, and circuit-wires M and O, spring-bar $S^3$, having pawl $A$, wheel $V^3$, having teeth, as described, of various heights, as described, whereby through the said pawl and spring-bar the axle $K^3$ is moved to bring the wheel $L^3$ from its position out of gear with the wheel $I^3$ into gear therewith and to a position beyond gearing therewith and in contact with the stop $B^4$, and bring the point $R^3$ in contact with the circuit-wire O and the axle $K^3$ in contact with the circuit-wire M, thereby forming an electrical connection between the said two circuit-wires, the hair-spring forming a fly-back device for returning the hand N to zero when the wheel $L^3$ has been returned to its first position out of gear with the wheel $I^3$, the whole substantially as described.

5. In a mechanism for making electrical connections, as described, the combination of the spring-bars $E^4$ and $K^4$, having pawls $F^4$ and $L^4$, wheels $V^3$ and $Z^3$, provided with teeth of equal length, measured circumferentially of the wheel, the bottoms of teeth 1, 2, and 3 being at different heights to each other, as described, arranged to be operated upon by the said pawls $F^4$ and $L^4$, whereby one push of the spring-bar $K^4$ will cause an equal revolution of the wheels $V^3$ and $Z^3$ that a series of pushes or operations of the pawl $F^4$ on a series, 1 2 3, of the teeth of the wheel $V^3$ will do, the whole constructed and arranged substantially as described.

6. In a mechanism for making electrical connections, the combination of the wheel $V^3$, having teeth, as described, of different heights, and axle $K^3$, with a spring-bar, $S^4$, provided with a pawl, $A^4$, arranged to act upon the teeth of the wheel $V^3$, whereby, according as the said pawl is engaged with teeth of various heights, the said axle $K^3$ is raised and lowered or moved to the different positions, as shown and described, the whole substantially as set forth.

7. The combination, in a mechanism for making electrical connections, of a revolving wheel, $I^3$, wheel $L^3$, and axle $K^3$, stop $B^4$, arranged to engage with the teeth of the wheel $L^3$ and hold it stationary, as described, hand N, arranged to form connection between the electrical circuit-wire M and an insulated station or location represented by the electrical wire O, situated at a distance from the casing, of which $A^3$ is the front, the whole substantially as described.

8. The combination, in a mechanism for making electrical connections, of an axle, K, having a hand, N, secured thereon, and a hair-spring, $O^3$, having one end attached to said axle, also a gear-wheel, $L^3$, secured thereon, by which the hand N is rotated in the one direction from zero, and thereby further winding up the said hair-spring, with revolving gear-wheel $I^3$, with which the gear-wheel $L^3$ is arranged to be engaged and disengaged, as described, and when so disengaged the said hair-spring $O^3$ is arranged to cause the hand N to return to zero by revolving the axle $K^3$ in the reverse direction, the whole substantially as described.

9. In a mechanism for making electrical connections, the combination of the longitudinally-movable axle $K^3$, having gear-wheel $L^3$, and hand N, secured thereon, with the continuously-revolving axle $H^3$, having gear-wheel $I^3$ secured thereon, the said gear-wheel $L^3$ being arranged to gear with the said gear-wheel $I^3$ and pass beyond therewith, whereby the hand N is rotated and stopped at pleasure, the whole substantially as described.

PETER W. WOOD.
JOHN B. WOOD.

Witnesses:
GEO. R. LIGHTHALL,
CHARLES G. C. SIMPSON.